(12) United States Patent
Norris et al.

(10) Patent No.: US 12,064,743 B2
(45) Date of Patent: *Aug. 20, 2024

(54) GAS PROCESSING DEVICE AND METHOD

(71) Applicant: Zelp LTD, London (GB)

(72) Inventors: Francisco Norris, London (GB); Patricio Norris, London (GB)

(73) Assignee: Zelp, LTD, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,311

(22) Filed: Jul. 22, 2022

(65) Prior Publication Data

US 2023/0011231 A1    Jan. 12, 2023

Related U.S. Application Data

(63) Continuation of application No. 16/623,827, filed as application No. PCT/GB2018/000096 on Jun. 20, 2018, now Pat. No. 11,426,703.

(30) Foreign Application Priority Data

Jun. 20, 2017   (EP) ..................................... 17176994

(51) Int. Cl.
| | | |
|---|---|---|
| *A01K 29/00* | (2006.01) | |
| *A01K 15/00* | (2006.01) | |
| *A47C 7/42* | (2006.01) | |
| *A47C 13/00* | (2006.01) | |
| *B01D 53/02* | (2006.01) | |

(Continued)

(52) U.S. Cl.
CPC ............... *B01J 19/24* (2013.01); *B01J 4/008* (2013.01); *B01J 12/007* (2013.01); *B01J 2204/002* (2013.01); *B01J 2219/00186* (2013.01)

(58) Field of Classification Search
CPC . B01J 19/24; B01J 4/008; B01J 12/007; B01J 2204/002; B01J 2219/00186; A01K 15/003; A01K 29/00; A47C 4/54; A47C 7/142; A47C 7/42; A47C 7/46;
(Continued)

(56) References Cited

U.S. PATENT DOCUMENTS

2004/0192546 A1*   9/2004   Dang ................... B01D 53/864
                                                                        502/332
2010/0279180 A1   11/2010   Herrema et al.
(Continued)

FOREIGN PATENT DOCUMENTS

| CN | 103229054 A | 7/2013 |
|---|---|---|
| CN | 204032059 U | 12/2014 |

(Continued)

OTHER PUBLICATIONS

Majumdar, Subhatosh , "India Examination Report Application No. 201937053200", Aug. 10, 2021, 5 Pages.
(Continued)

*Primary Examiner* — Huy Tram Nguyen
(74) *Attorney, Agent, or Firm* — Blanchard Horton PLLC

(57) ABSTRACT

A methane conversion device is provided that includes a reaction chamber comprising a converter that is configured to oxidize methane. A sensor is provided that is adapted to detect the presence of methane within gas exterior to the methane conversion device. A positioner is provided for positioning the device on an animal.

15 Claims, 2 Drawing Sheets

(51) Int. Cl.
  *B01J 4/00* (2006.01)
  *B01J 12/00* (2006.01)
  *B01J 19/24* (2006.01)

(58) Field of Classification Search
  CPC ......... A47C 9/002; A47C 13/00; Y02C 20/20; C01B 2203/1241
  USPC ....................................................... 502/300
  See application file for complete search history.

(56) References Cited

U.S. PATENT DOCUMENTS

| | | | | |
|---|---|---|---|---|
| 2012/0115240 A1* | 5/2012 | Caldeira | ................ | B01D 53/72 422/198 |
| 2021/0138428 A1 | 5/2021 | Norris et al. | | |

FOREIGN PATENT DOCUMENTS

| | | | | |
|---|---|---|---|---|
| CN | 105987391 A | 10/2016 | | |
| GB | 2169204 A | * 7/1986 | ............... | A61L 9/16 |
| GB | 2450506 A | 12/2008 | | |
| JP | 2008086942 A | 4/2008 | | |
| JP | 2006312143 A | 4/2009 | | |
| RU | 2548878 C2 | 2/2014 | | |
| RU | 2560985 C2 | 8/2015 | | |
| UA | 97818 C2 | 3/2012 | | |
| WO | WO-0064245 A1 | * 11/2000 | ........... | A01K 11/006 |
| WO | 2011130538 A2 | 10/2011 | | |
| WO | 2012013235 A1 | 2/2012 | | |
| WO | WO-2012013235 A1 | * 2/2012 | ........... | A01K 1/0047 |
| WO | 2013068341 A1 | 1/2013 | | |
| WO | 2016207331 A2 | 12/2016 | | |
| WO | WO-2016207331 A2 | * 12/2016 | ......... | B01D 53/0407 |

OTHER PUBLICATIONS

Sasaki, Noriko , "Japanese First Office Action", Mar. 3, 2022, 8 Pages.
Sayan, O.S. , "Russian First Office Action", Jul. 28, 2021, 14 Pages.
Sayan, O.S. , "Russian Search Report Application No. 201914464004", Jul. 9, 2021, 4 Pages.
Ziqiu, Zu , "Chinese First Office Action", 11 Pages.

* cited by examiner

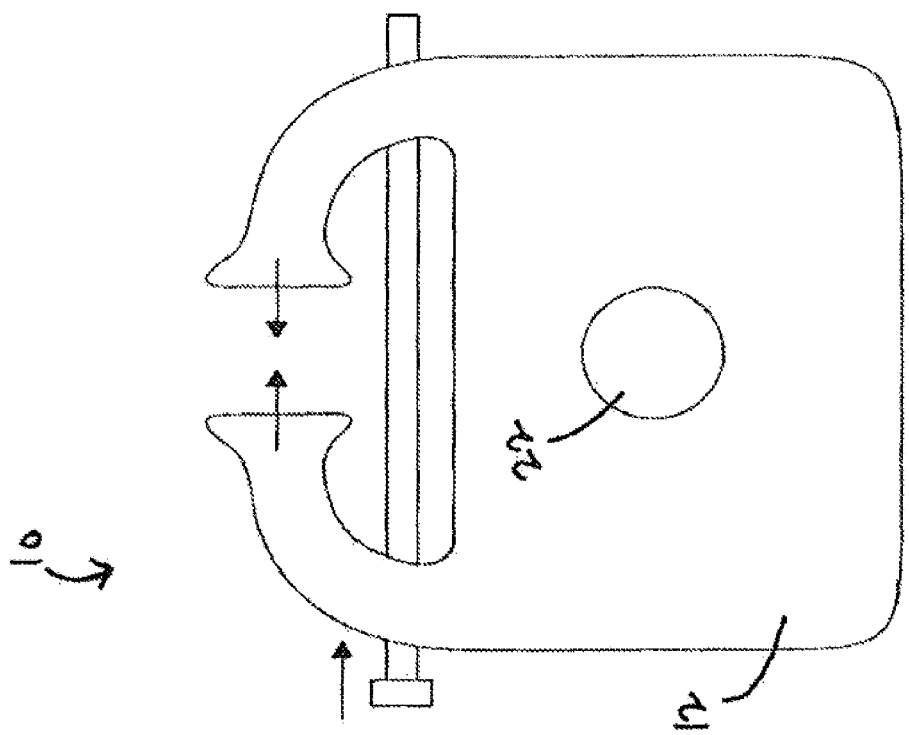
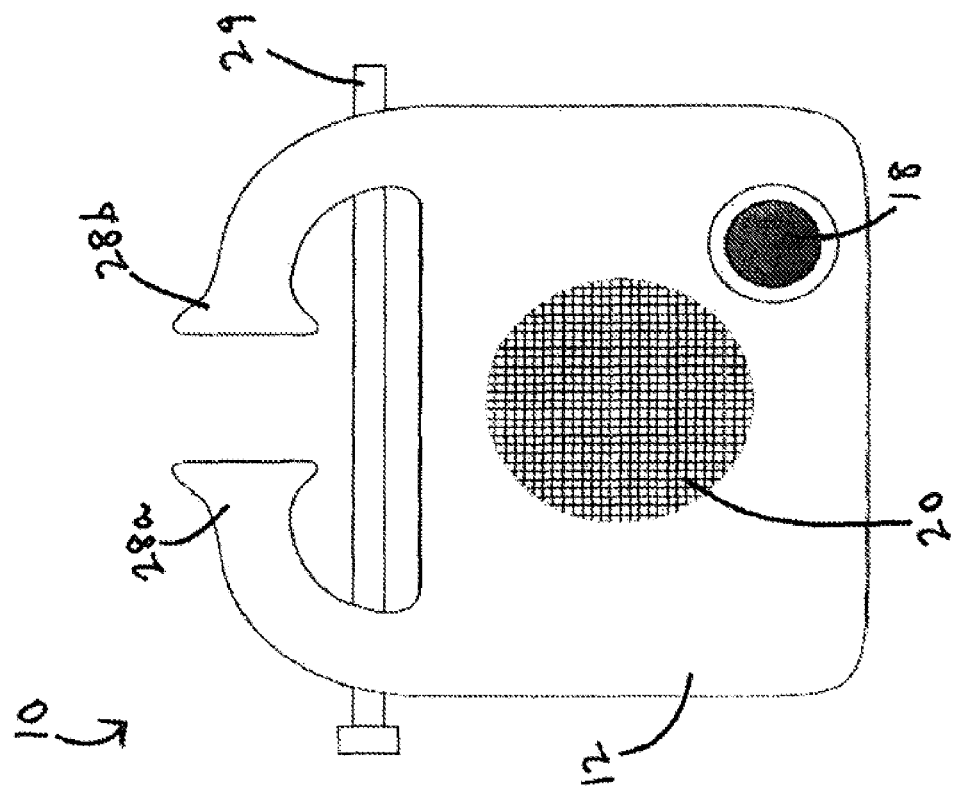

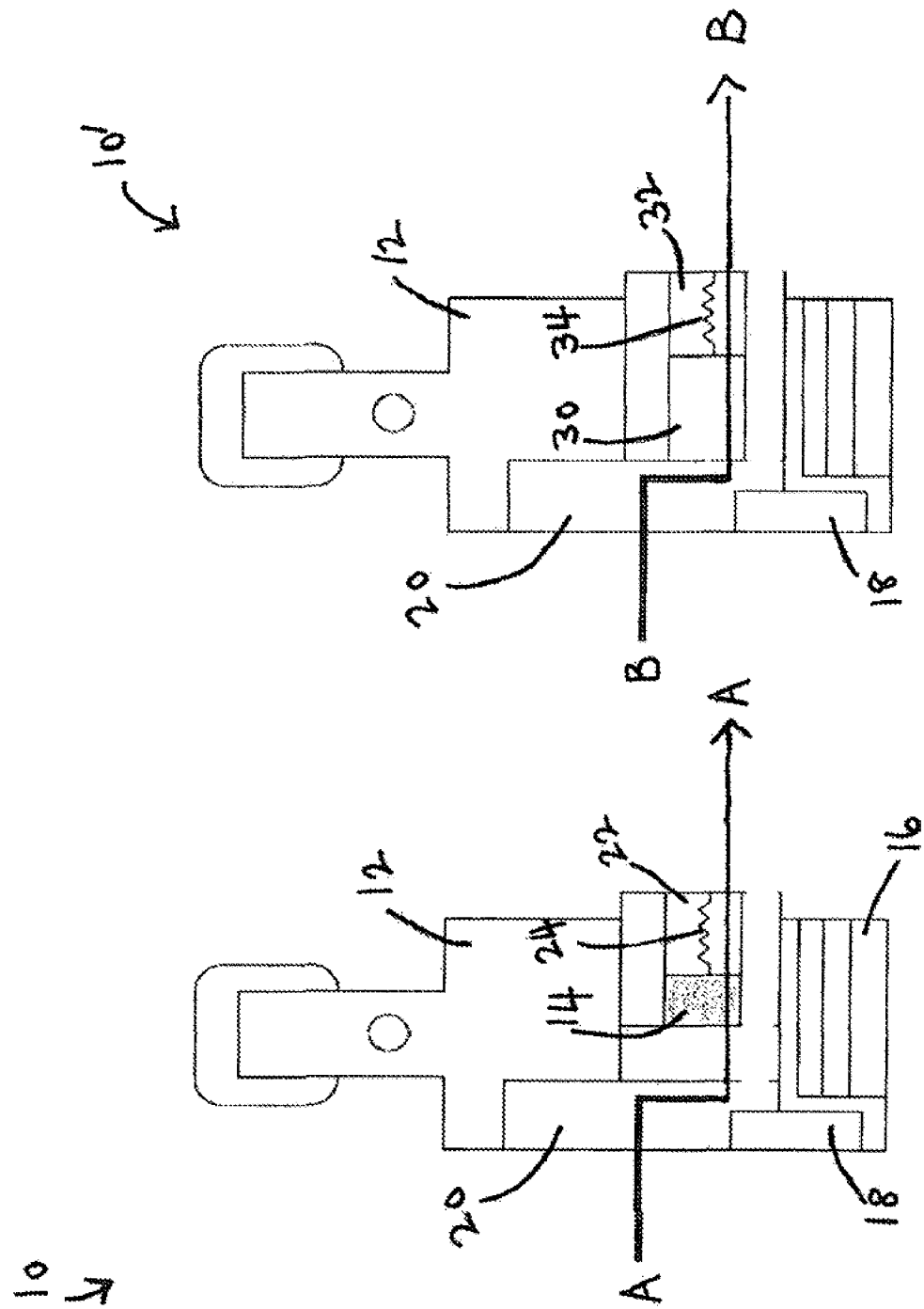

GAS PROCESSING DEVICE AND METHOD

CROSS-REFERENCE TO RELATED APPLICATIONS

This Application claims the benefit of U.S. patent application Ser. No. 16/623,827, filed on Dec. 18, 2019, which claims priority to International (PCT) Patent Application Number PCT/GB2018/000096, filed on Jun. 20, 2018, which in turn claims priority to European Patent Application No. EP17176994.6, filed on Jun. 20, 2017. The content of each of the aforesaid applications is incorporated herein in their entireties by reference.

STATEMENT REGARDING FEDERALLY SPONSORED RESEARCH OR DEVELOPMENT

Not Applicable.

FIELD OF INVENTION

The present invention relates to a gas processing device for oxidizing methane gas, particularly a gas processing device for oxidizing methane gas from livestock.

BACKGROUND

Methane is known to be a potent greenhouse gas, having a global warming potential that is considerably higher than that of carbon dioxide. Livestock are known to be a significant source of methane gas, which is released via belching and flatulence, and this may have direct economic consequences for livestock producers, as they may be subject to taxes based on their carbon footprint.

For these reasons, it is desirable to reduce methane emissions from livestock.

SUMMARY OF THE INVENTION

Therefore, at its most general, the present invention may provide a device for reducing the methane content of gaseous emissions from animals such as livestock. This may be achieved by providing a device that may be worn by the animal and that is adapted to draw the animal's gaseous emissions into a reaction chamber in which conversion means are provided for oxidizing the methane present in the emissions. The principal products of the oxidation process are typically carbon dioxide and water, which are considered to have lower global warming potential than methane.

In a first aspect, the present invention may provide a methane conversion device comprising: a reaction chamber; a sensor for detecting the presence of methane; blowing means for directing external gasses into the reaction chamber when the sensor detects the presence of methane above a predetermined threshold; conversion means that are configured to oxidize methane; and positioning means for positioning the device on an animal.

Typically, the blowing means are configured to direct external gasses into the reaction chamber when the sensor detects the presence of methane above 100 ppm, possibly above 150 ppm. The blowing means may be provided by e.g. an axial flow fan. The blowing means may assist in allowing methane detected by the sensor to be captured by the device before it disperses into the air.

The presence of a sensor for detecting methane allows the device to be activated only when a predetermined level of methane is detected. This allows efficient use of any power sources (e.g. batteries) that are required to power the device.

In general, the reaction chamber has a volume less than 200 ml, possibly less than 150 ml. The reaction chamber may be provided by the exhaust of the device.

Typically, the conversion means comprise a heating element, which may be e.g. a wire. In certain cases, the wire has a coiled configuration.

Preferably, the heating element is a metallic resistance heating element. The metallic resistance heating element typically comprises a metallic alloy selected from the group comprising: nickel-chromium alloys, nickel-iron alloys, iron-chromium-aluminum alloys, stainless steel, tungsten alloys, or copper-nickel alloys. Preferably, the heating element comprises nickel as its principal component. For example, the heating element may be provided by a nichrome wire.

In certain embodiments, the heating element may be located within the reaction chamber.

In these embodiments, the device may comprise filtration means that are configured to inhibit the entry of one or more gaseous species other than methane into the reaction chamber (that is: some, but not necessarily all external gasses are directed into the reaction chamber by the blowing means). This helps to increase the methane concentration in the reaction chamber to a level above the lower explosive limit of methane (this is typically about 4% by volume of air, depending on temperature and pressure), so that the methane becomes oxidized as it passes over the heating element. The filtration means may comprise one or more of the following: charcoal, activated carbon, or a strong base such as potassium hydroxide. These filtration means principally inhibit the passage of carbon dioxide, but other filtration means may be provided that inhibit the passage of other gaseous species.

In other embodiments, the device may comprise trapping means that are configured to trap methane before it enters the reaction chamber e.g. through absorption of the methane. Such trapping means typically permit the passage of nitrogen and oxygen into the reaction chamber. Thus, some but not all external gasses are directed into the reaction chamber by the blowing means.

Such trapping means may be provided by a porous material such as a zeolite. The presence of the trapping means allows the concentration of methane to be increased before it enters the reaction chamber. Methane may be released from the trapping means through the action of a further heating element that is configured to heat the trapping means. In certain embodiments, a carbon dioxide filter may be provided between the blowing means and the trapping means, in order to limit the amount of carbon dioxide arriving at the trapping means, so as to increase the capacity of the trapping means to trap methane.

It is thought that zeolites trap methane more effectively when the methane impinges on the zeolite at higher speed and hence higher partial pressure. This represents a further potential benefit of providing blowing means in the device.

In other embodiments, the conversion means may comprise additionally a catalyst, the catalyst being located within the reaction chamber. Typically, the catalyst comprises one or more of the following: palladium, copper, or silica.

In these embodiments, the catalyst is adapted to facilitate the conversion of methane to carbon dioxide and water. The catalyst is typically in thermal contact with a heating element e.g. a wire.

Preferably, the heating element is a metallic resistance heating element. The metallic resistance heating element typically comprises a metallic alloy selected from the group comprising: nickel-chromium alloys, nickel-iron alloys, iron-chromium-aluminum alloys, stainless steel, tungsten alloys, or copper-nickel alloys. Preferably, the heating element comprises nickel as its principal component. For example, the heating element may be provided by a nichrome wire.

Typically, the means for positioning the device on the animal are configured to allow the device to be attached to the animal's nose (so as to convert the methane released in the animal's exhalations). Thus, the means for positioning the device on an animal may comprise a nose ring that is configured for attachment to an animal, for example a bovine. In other embodiments, the means for positioning the device may comprise a clip, e.g. two opposed resilient arms that are configured to retain a portion of the animal's body, such as the septum, therebetween.

It is beneficial for the device to be positioned such that it is able to capture methane exhaled from the mouth of the animal (e.g. a bovine), as this typically represents the major proportion of the methane exhalations from an animal.

In other embodiments, the device may be configured to be attached, for example clipped, to the animal's tail, to allow the device to process gasses emitted through flatulence.

Devices according to the first aspect of the invention may provide a means for obtaining data about the methane exhalation of animals such as bovines, which may be of importance to farmers, as well as pharmaceutical companies, nutritional/feed companies, and government organizations.

In a second aspect, the present invention may provide a methane conversion device comprising: a reaction chamber comprising conversion means that are configured to oxidize methane; a methane retention component; means for causing methane to be released from the methane retention component into the reaction chamber; a sensor that is adapted to detect the presence of methane within gas exterior to the methane conversion device; blowing means configured to drive gas from the exterior of the device onto the methane retention component when the sensor detects the presence of methane above a predetermined threshold; and positioning means for positioning the device on an animal.

Typically, the methane retention component comprises a chamber containing a porous material that is configured to reversibly absorb methane. Typically, the porous material is provided by a zeolite mineral.

In general, a carbon dioxide filter is provided between the blowing means and the methane retention component, the carbon dioxide filter being configured to inhibit the passage of carbon dioxide to the methane retention component.

Preferably, the means for causing methane to be released from the methane retention component into the reaction chamber comprises a heating element.

The reaction chamber, sensor, blowing means, conversion means and positioning means may correspond to any of the equivalent components of the device according to the first aspect of the invention.

DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 1 shows a schematic front elevation view of a first embodiment of a methane conversion device according to a first aspect of the present invention;

FIG. 2 shows a schematic rear elevation view of the device of FIG. 1;

FIG. 3 shows a cross-sectional view of the device of FIG. 1; and

FIG. 4 shows a cross-sectional view of a second embodiment of a methane conversion device according to the first aspect of the present invention.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Referring to FIGS. 1-3, a methane conversion device 10 comprises a housing 12 in which are provided a reaction chamber 14 and a battery compartment 16. The housing further comprises a methane sensor 18 disposed on the front side of the conversion device and blowing means 20 located adjacent the methane sensor 18 on the front side of the combustion device. Blowing means 20 are provided by an axial flow fan that is configured to drive gas from the exterior of the device towards reaction chamber 14.

Exhaust 22 is provided on the rear side of conversion device 10 and adapted to channel a gas stream from reaction chamber 14 towards the exterior of the device 10.

A palladium-containing catalytic bed is located within reaction chamber 14. The catalytic bed is in thermal contact with nichrome wire heating element 24.

Opposed arms 28a, 28b are configured to retain the septum of the bovine therebetween. Tensioning bar 29 allows opposed arms 28a, 28b to be pulled closer together.

In use, opposed arms 28a,b are positioned on either side of the septum of the bovine and tensioning bar 29 is tightened so that opposed arms 28a,b retain the septum securely therebetween. Conversion device 10 is oriented such that the front side of the device faces the bovine's mouth. When the sensor 18 detects a methane concentration greater than e.g. 200 ppm, the blowing means 20 are activated to direct the exhaled gas from the bovine into reaction chamber 14. The catalyst in reaction chamber 14 is heated to a temperature of e.g. 600-700° C. by the nichrome wire heating element 24. The methane gas passing over the catalyst is oxidized to form principally water vapor and carbon dioxide, which are expelled from the device via exhaust 22.

Thus, the gas flow through the device follows the path denoted by arrow A-A.

An alternative embodiment of the combustion device is shown in FIG. 4 that has the same features as the embodiment of FIGS. 1-3, except that a filter 30 is provided between the blowing means 20 and the exhaust 32, instead of a catalyst. The filter 30 absorbs gasses such as carbon dioxide that are also present in the bovine exhalation, in order to increase the concentration of methane in the gas being transferred to the exhaust 32.

In this embodiment, the reaction chamber is provided within the exhaust 32. The reaction chamber comprises a nichrome wire heating element 34.

Other features of this alternative embodiment of the combustion device are the same as for the embodiment of FIGS. 1-3, and are denoted by like numerals.

In use, opposed arms 28a, 28b are positioned on either side of the septum of the bovine and tensioning bar 29 is tightened so that opposed arms 28a, 28b retain the septum securely therebetween. The combustion device 10' is oriented such that the front side of the device faces the bovine's mouth. When the sensor 18 detects a methane concentration greater than e.g. 200 ppm, blowing means 20 are activated to direct the exhaled gas from the bovine through filter 30 and into exhaust 32.

Filter 30 extracts carbon dioxide from the gas stream, so as to increase the methane concentration to a level above the lower explosive limit of methane, which is approximately 4% by volume of air, depending on temperature and pressure. Once the gas stream enters exhaust 32 it passes over nichrome wire heating element 34, which is heated to a temperature of 700-800° C. The heating element 34 causes the methane in the gas stream to become oxidized to form principally carbon dioxide and water vapor, which are then expelled from the device via exhaust 32.

Thus, the gas flow through the device follows the path denoted by arrow B-B.

In a variant of the embodiment of FIG. 4, the filter 30 is provided by a chamber containing zeolite particles that are adapted to trap methane and carbon dioxide, while allowing nitrogen and oxygen to pass through into the reaction chamber 32. Once the zeolite particles reach saturation point (that is, they are not able to absorb any more carbon dioxide or methane), a filter heating element (not shown) is activated. This causes the trapped methane to be released into the reaction chamber 32 at a relatively high concentration, so that it may become oxidized as it passes over heated nichrome wire 34. This arrangement helps to ensure that the methane concentration in the reaction chamber 32 is above the lower explosive limit of the methane.

In a further modification of this variant, a further filter (not shown) is provided between blowing means 20 and the zeolite-containing chamber 30, the further filter being adapted to limit the amount of carbon dioxide arriving at the zeolite-containing chamber 30, so that the capacity of the zeolite particles to trap methane is increased.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A methane conversion device, comprising:
    a reaction chamber comprising a converter that is configured to oxidize methane;
    a sensor that is adapted to detect the presence of methane within gas exterior to the methane conversion device; and
    a positioner for positioning a front side of the device to face a mouth and nose of an animal, the positioner comprising a fastener adjacent an exterior of the reaction chamber,
    wherein the methane conversion device is configured to be positioned to capture methane exhaled from a mouth or nose of an animal, in use.

2. The device of claim 1 further comprising a porous zeolite mineral configured to absorb methane.

3. A methane conversion device according claim 1, wherein the device comprises a filter configured to inhibit the entry of one or more gaseous species other than methane into the reaction chamber.

4. A methane conversion device according to claim 1, wherein the device comprises a trap configured to trap methane before it enters the reaction chamber.

5. A methane conversion device according to claim 1, wherein the reaction chamber has a volume less than 200 ml.

6. A methane conversion device according to claim 1, wherein the converter comprises a heating element.

7. A methane conversion device according to claim 6, wherein the heating element comprised in the converter is a wire.

8. A methane conversion device according to claim 6, wherein the heating element comprised in the converter is a metallic resistance heating element.

9. A methane conversion device according to claim 8, wherein the metallic resistance heating element comprises principally nickel.

10. A methane conversion device according to claim 9, wherein the metallic heating element is a nichrome wire.

11. A methane conversion device according to claim 7, wherein the heating element comprised in the converter is located within the reaction chamber.

12. A methane conversion device according to claim 5, wherein the converter comprises additionally a catalyst, the catalyst being located within the reaction chamber.

13. A methane conversion device according to claim 12, wherein the catalyst comprises palladium.

14. A methane conversion device according to claim 1, wherein the positioner comprises a pair of opposed arms with a tensioning member configured to draw the opposed arms toward one another.

15. A method of converting methane emitted from an animal into other chemical species, comprising the steps of:
   a. providing a methane conversion device comprising a reaction chamber comprising a converter that is configured to oxidize methane, a sensor that is adapted to detect the presence of methane within gas exterior to the methane conversion device, and a positioner for positioning a front side of the device to face a mouth and nose of an animal, the positioner comprising a clamp; and
   b. clamping the device on an animal.

* * * * *